United States Patent [19]
Linnenberg

[11] Patent Number: 5,144,577
[45] Date of Patent: Sep. 1, 1992

[54] TWO-SUM COMPARATOR

[75] Inventor: Gerhard Linnenberg, Mering, Fed. Rep. of Germany

[73] Assignee: Siemens Aktiengesellschaft, Munich, Fed. Rep. of Germany

[21] Appl. No.: 661,221

[22] Filed: Feb. 27, 1991

[30] Foreign Application Priority Data

Mar. 20, 1990 [EP] European Pat. Off. ......... 90105265.4

[51] Int. Cl.⁵ .......................... G06F 7/02; G06F 7/50
[52] U.S. Cl. ................................. 364/769; 340/146.2; 364/786
[58] Field of Search ................. 364/769, 786; 340/146.2

[56] References Cited

U.S. PATENT DOCUMENTS

| | | | |
|---|---|---|---|
| 3,299,261 | 1/1967 | Steigerwalt, Jr. | 364/786 |
| 4,683,548 | 7/1987 | Mlynek | 364/786 |
| 4,761,759 | 8/1988 | Nakagawa | 364/769 |
| 4,901,270 | 2/1990 | Galbi et al. | 364/786 |

FOREIGN PATENT DOCUMENTS 0191452 2/1986 European Pat. Off. .

OTHER PUBLICATIONS

"Halbleiter-Schaltungstechnik" by U. Tietze Ch. Schenk, 5th Edition, 1980, pp. 473-477.

*Primary Examiner*—David H. Malzahn
*Attorney, Agent, or Firm*—Hill, Van Santen, Steadman & Simpson

[57] ABSTRACT

A two-sum comparator. The two-sum comparator provides a comparison of two sums that is carried out by comparing their difference to zero. The formation of the difference of two sums that is essentially a four-addend addition is reduced to a two-addend addition according to a carry-save principle. The remaining two-addend addition is not carried out, but rather, one addend is directly compared to a negative of the other addend in a binary counter comparator.

3 Claims, 1 Drawing Sheet

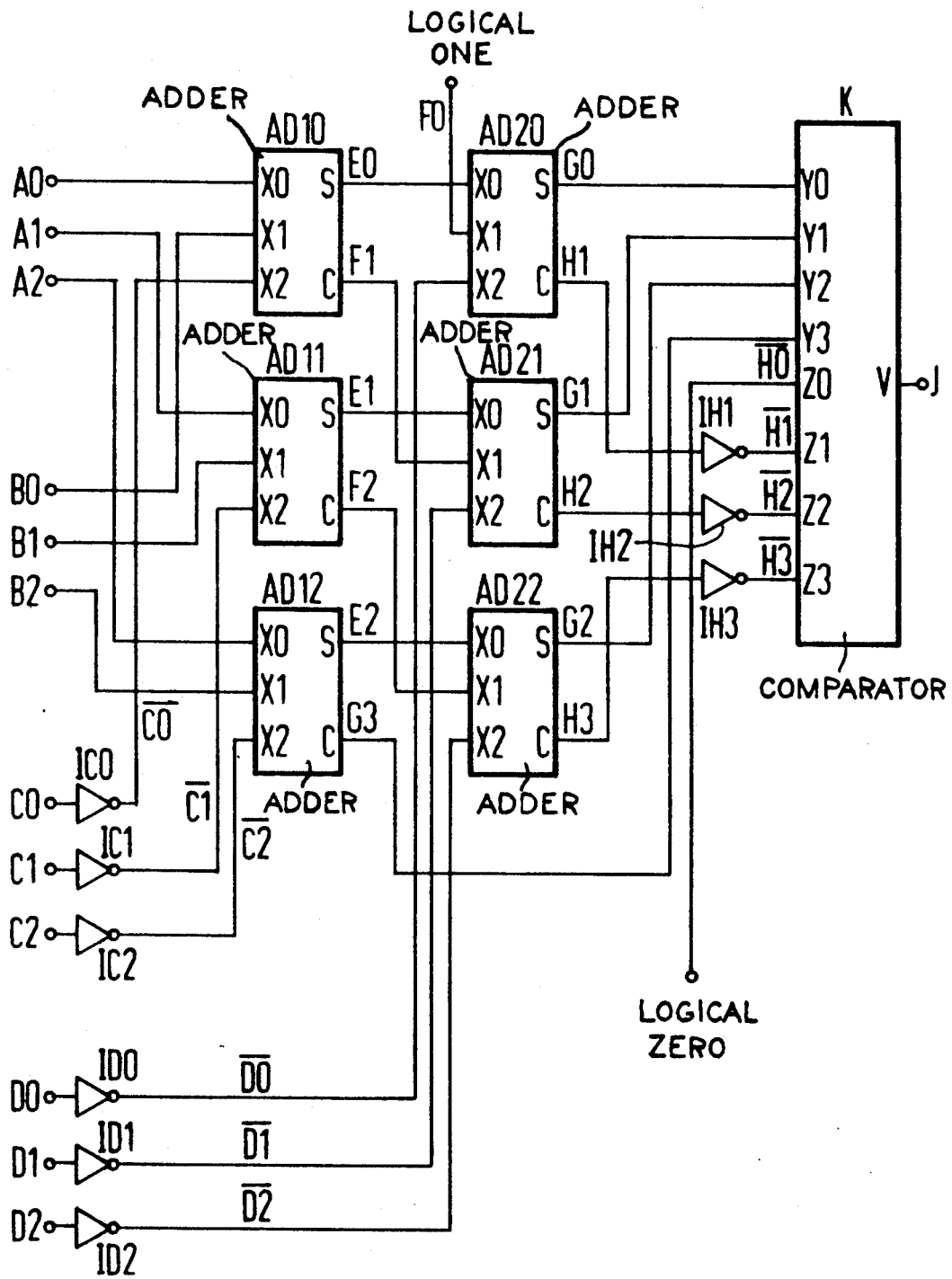

TWO-SUM COMPARATOR

BACKGROUND OF THE INVENTION

The present invention is directed to a circuit arrangement for comparing a sum of two binary numbers to a sum of two other binary numbers.

It is necessary in many applications to compare two binary numbers that in turn each respectively represent a sum of two binary numbers. Usually, the two sums are formed first and the results of the summations are subsequently compared to one another. Two circuit concepts are in use for forming sums. First, one-bit full adders (carry-ripple adders) are used having inputs for receiving respectively two equivalent places of the two binary numbers to be added and the carry place of the one-bit full adder for the respectively next-lower place. The circuit complexity can thereby be kept relatively low. However, the calculating time of such an adder is considerably longer than that of an adder with individual stages. Second, adders having parallel carry logic (carry-look-ahead adder) are used, wherein all carries are directly calculated from an input variable. As a result these adders have a shorter calculating time but require a higher circuit outlay because of the additional logic. Both principles are disclosed in, among other references, U. Tietze, Ca. Schenk, Halbleiter-Schaltungstechnik, 5th Edition, 1980, pages 473 through 477.

SUMMARY OF THE INVENTION

It is an object of the present invention to provide a circuit arrangement for comparing a sum of two binary numbers to a sum of two other binary numbers that, given a short calculating time, requires little circuit-oriented outlay.

The present invention involves a circuit arrangement for comparing a sum of a maximally n-place first binary number and of a maximally n-place second binary number to a sum of a maximally n-place third binary number and of a maximally n-place fourth binary number. The circuit arrangement has n first inverters on whose inputs the third binary number is received and on whose outputs an inverted third binary number is provided. Also provided are n second inverters on whose inputs the fourth binary number is received and on whose outputs an inverted fourth binary number is provided. In the circuit arrangement n first one-bit full adders have inputs which receive the respective places having equal significance of the first, second and inverted third binary number and have outputs which provide a respective result bit and a respective carry bit having a significance which is greater by one place in comparison to the respective result bit. Furthermore, n second one-bit full adders are provided on whose inputs are received the respective result bits and the carry bits of the first one-bit full adders and the places of the inverted fourth binary number having the respectively same significance. The carry bit corresponding to the place having the least significance is set equal to a logical one. The n second one-bit full adders have outputs, each of which provide a respective result bit and a respective carry bit having a significance that is greater by one place in comparison to the respective result bit. Also n third inverters are provided on whose inputs the respective carry bits of the second one-bit full adders are received and on whose outputs the inverted carry bits are provided. A binary number comparator has first inputs for receiving a fifth binary number whose least significant places are the result bits of the second one-bit full adders having corresponding significances and whose place having the highest significance is the carry bit of the first one-bit full adder having the highest significance. The comparator has second inputs for receiving a sixth binary number whose more significant places are the inverted carry bits having the corresponding significances and whose place having the least significance is a logical zero.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single figure is a schematic block diagram of a two-sum comparator of the present invention.

DESCRIPTION OF THE PREFERRED EMBODIMENT

The present invention has general applicability, but is most advantageously utilized in a circuit arrangement as depicted in the single figure.

In the illustrated exemplary embodiment as shown in the single figure, the sum of a first binary number having $n=3$ places A0, A1, A2 and of a second binary number having $n=3$ places B0, B1, B2 is to be compared to the sum of a third binary number having $n=3$ places C0, C1, C2 and of a fourth binary number having $n=3$ places D0, D1, D2. To that end, three one-bit full adders AD10, AD11, AD12 are provided at whose inputs X0, X1, X2 the respective places of equal significance of the first, second, and inverted third binary number are applied. As a result, for example, the inputs X0, X1, X2 of the one-bit full adder AD10 receive the least significant places A0, B0 $\overline{C0}$ of the first, second and inverted third binary numbers, the inputs X0, X1, X2 of the one-bit full adder A11 receive the more significant places A1, B1, $\overline{C1}$ of these binary numbers and the inputs X0, X1, X2 of the one-bit full adder A12 receive the most significant places A2, B2, C2 of these binary numbers. The inversion of the individual places C0, C1, C2 of the third binary number is performed by respectively three inverters IC0, IC1, IC2.

The one-bit full adders AD10, AD11, AD12 each respectively have two outputs S and C on which the summation result is available. A result bit that has a significance that is less by one place than a carry bit on the respective output C is available at the output S. This means that a total of three result bits E0, E1, E2 and three carry bits F1, F2, G3 are provided by three one-bit full adders AD10, AD11, AD12. The result bit E0 is the least significance, the result bit E1 and carry bit F1 have the next-higher significance, the result bit E2 and carry bit F2 again have a next-higher significance and, finally, the carry bit G3 has the highest significance.

The result bits and the carry bits of equal significance as well as the places of equal significance in the inverted, fourth binary number are respectively received by the inputs of further one-bit full adders AD20, AD21, AD22 respectively allocated to them, whereby the inversions of the individual places D0, D1, D2 of the fourth binary number are performed by inverters ID0, ID1, ID2. The inputs X0, X1, X2 of the one-bit full adder AD20 receive the result bit E0 and with the bit $\overline{D0}$ of the inverted fourth binary number, the inputs X0, X1, X2 of the one-bit full adder A21 receive the result bit E1, the carry bit F1 and the bit $\overline{D1}$ of the inverted fourth binary number and the inputs X0, X1, X2 of the one-bit full adder A22 receive the result bit E2, the carry bit F2 and the bit $\overline{D2}$ of the inverted fourth binary number. One input of the full adder AD20, however, is not used in this fashion since the least significant carry bit has a significance which is greater by one place than the least significant result bit. This input, the input X1 of the one-bit full adder AD20 in the present exemplary embodiment, is set to a logical "one" for reasons that shall be set forth below.

The summation result (result bits G0, G1, G2) and the carry bits H1, H2, H3 are output on the outputs S and C of the one-bit full adders AD20, AD21, AD22. The result bits G0, G1, G2 of the one-bit full adder AD20, AD21, AD22 now form the three least significant places and the carry bit G3 of the one-bit full adder AD12 forms the more significant place of a fifth binary number, whereas the carry bits H1, H2, H3 of the one-bit full adders AD20, AD21, AD22 form the more significant places of a sixth binary number. For reasons that shall also be set forth below, the least significant place, bit H0, of the sixth binary number is set equal to a logical "one", that an inverted bit $\overline{H0}$ is a logical "zero".

Fifth and sixth binary number are subsequently compared to one another by a binary number comparator K. The result of this comparison, a greater-than comparison, smaller-than comparison and/or equal-to-comparison, is output at an output V of the binary number comparator K with an output bit J. The results bits G0, G1, G2 and the carry bit G3 are received, respectively, on inputs Y0, Y1, Y2 and Y3 of the comparator K. Inverted bit H0 and inverted bits $\overline{H1}$, $\overline{H2}$, $\overline{H3}$, are received, respectively, on inputs Z0, Z1, Z2, Z3.

In a circuit arrangement of the present invention, two sums are not explicitly formed and compared to one another. Rather, a comparison of the difference between the two sums and zero is first performed. The formation of the difference of two sums that is essentially a four-addend addition is reduced to a two-addend addition according to the carry-save principle, whereby the two-addend addition is not carried out, but rather the one addend is directly compared to the negative of the other in a binary number comparator. The formation of the difference occurs by addition of a binary number to a negative, other binary number, whereby the negative binary number is present in two's complement. The two's complement of a binary number derives by bit-by-bit inversion and addition with a one. The inversion in the circuit arrangement of the present invention shown in the exemplary embodiment occurs with the inverters IC0, IC1, IC2, ID0, ID1, ID2, IH1, IH2, IH3.

The addition of the one's thereby occurs without additional adders since, after every one of the two full-adder units having the one-bit full adders AD10, AD11, AD12 or, respectively, AD20, AD21, AD22, the carry bits are incremented in significance by one place in comparison to the respective result bit, so that the carry bit corresponding to the least significant result bit is always equal to a logical "zero". However, when this is equated with a logical "one", then this corresponds to an addition with one and, in combination with the inversion of the third binary number, is the formation of the two's complement of the third binary number. The input of the one-bit adder AD20 is thus set with a carry bit F0 equal to a logical "one". Let the least significant place of the sixth binary number also be first equated to a logical "one", this again corresponding to an addition with one and, together with the inversion of the fourth binary number, yields the two's complement of the fourth binary number. However, since the sixth binary number is subsequently inverted, only the carry bits $\overline{H1}$, $\overline{H2}$, $\overline{H3}$ are now inverted with the inverters IH1, IH2, IH3. Now, let the least significant place $\overline{H0}$ of the inverted sixth binary number having the places H1, H2, H3, be set equal to a logical "zero", as a result whereof an inverter is eliminated. However, the two's complement of the sixth binary number must still be formed. After the inversion, a one must also be added. Since the least significant place $\overline{H0}$ of the inverted sixth binary number, as already shown, is always equal to a logical "zero", this place merely has to be equated to a logical "one" for the purpose of the addition with one.

The added outlay compared to a standard circuit principle having two summers each respectively constructed of n one-bit full adders and having a comparator is merely a maximum of 3n inverters, whereby n is the maximum number of places of the binary numbers to be added. The circuit complexity is thus only slightly increased, whereas the calculating time is greatly shortened and is on the order of magnitude of the calculating time obtainable with summers operating according to the carry-look-ahead principle which, however, as already addressed at the outset, require a considerably higher, additional circuit complexity. A preferred employment of a two-sum comparator of the present invention, for example, is in the realization of the Viterbi algorithm which is known, for example, from G. David Forny, Jr., The Viterbi Algorithm, Proc. IEEE, Vol. 61, No. 3, March 1973.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for comparing a sum of a maximally n-place first binary number and of a maximally n-place second binary number to a sum of a maximally n-place third binary number and of a maximally n-place fourth binary number, comprising: n first inverters having inputs for receiving the third binary number and having outputs for providing an inverted third binary number; n second inverters having inputs for receiving the fourth binary number and having outputs for providing an inverted fourth binary number; n first one-bit full adders having inputs for receiving respective places having equal significance of the first, second and inverted third binary numbers and having outputs for providing a respective result bit and a respective carry bit having a significance which is greater by one place in comparison to the respective result bit; n second one-bit full adders having inputs for receiving the respective result bits of the n first one-bit full adders, the carry bits of the n first one-bit full adders except for the carry bit of a first one-bit full adder of the n first one-bit full adders having a highest significance, and the inverted fourth binary number having the respectively same significance, a carry bit corresponding to the place having the least significance being set equal to a logical one, and being received on the input of a second one-bit full adder having a least significance, and the n second full bit adders having outputs providing a respective result bit and a respective carry bit having a significance that is greater by one place in comparison to the respective result bit; n third inverters having inputs for receiving the respective carry bits of the n second one-bit full adders and having outputs for providing inverted carry bits, respectively; and a binary number comparator having first inputs for receiving a fifth binary number whose least significant places are the result bits of the n second one-bit full adders having corresponding significances and whose place having the highest significance is the carry bit of a first one-bit full adder having the highest significance of the n first one-bit full adders, and having second inputs for receiving a sixth binary number whose more significant places are the inverted carry bits of the respective carry bits of the n second one-bit full adders having the corresponding significances and whose place having a least significance is a logical zero.

2. A circuit arrangement for comparing a sum of first and second binary numbers to a sum of third and fourth binary numbers, each of said first, second, third and fourth binary numbers having n-places having significances of least significance to most significance, comprising:

a set of n first inverters for receiving the third binary number and for providing an inverted third binary number;

a set of n second inverters for receiving the fourth binary number and for providing an inverted fourth binary number;

n first one-bit full adders each having n inputs, each of the n first one-bit full adders having its respective inputs receiving individual places of equal significance of the first, second and inverted third binary numbers, and the n first one-bit adders each having two outputs, one output thereof providing a result bit and the other output thereof providing a carry bit;

n second one-bit full adders each having n inputs, each of the n second one-bit full adders having one input thereof receiving a result bit of a corresponding first one-bit full adder of the n first one-bit full adders, another input thereof receiving a place of equal significance of the inverted fourth binary number, and a further input thereof receiving a carry bit of a first one-bit full adder of the n first one-bit full adders having a one place higher significant place, a further input of a second one-bit full adder of the n second one-bit full adders corresponding to a least significant place receiving a logical one, and the n second one-bit full adders each having two outputs, one output thereof providing a result bit and the other output thereof providing a carry bit;

a third set of n inverters for receiving the carry bits of the n second one-bit full adders and for providing inverted carry bits, respectively;

a binary number comparator having n+1 first inputs, n first inputs thereof receiving the result bits, respectively, of the n second one-bit full adders and the n+1 first input thereof receiving the nth carry bit of a first one-bit full adder of the n first one-bit full adders corresponding to a most significant place, and the binary number comparator having n+1 second inputs, a first least significant place input of the n+1 second inputs receiving a logical zero and second through n+1 second inputs of the second set of n+1 inputs receiving the inverted carry bits, respectively, and the binary number comparator having an output providing a result indicative of one of a greater-than comparison, a smaller-than comparison or an equal-to comparison of a sum of the first and second binary numbers and a sum of the third and fourth binary numbers.

3. A circuit arrangement for comparing a sum of first and second binary numbers to a sum of third and fourth binary numbers, each of said first, second, third and fourth binary numbers having n-places having significances of least significance to most significance, comprising:

means for inverting the third binary number to provide an inverted third binary number;

means for inverting the fourth binary number to provide an inverted fourth binary number;

means for adding corresponding significant places of the first, second and inverted third binary numbers to produce first result and first carry bits of least to most significant places;

means for forming a fifth binary number from the first result and first carry bits by adding respective first result bits, first carry bits, except for a most significant carry bit, that are more significant by one place than associated first result bits, and the inverted fourth binary number, a logical one being provided for a least significant place with the first carry bits, the means for forming the fifth binary number providing second result and second carry bits, the second result bits being the least through more significant places, that is one place less than a most significant place of the fifth binary number, and the most significant place of the fifth binary number being the most significant first carry bit of the means for adding corresponding significant places of the first, second and inverted third binary numbers;

means for forming a sixth binary number by inverting the second carry bits and a logical one, the inverted logical one being a least significant place of the sixth binary number;

means for comparing respective significant places of the fifth and sixth binary numbers to provide a result indicative of one of a greater-than comparison, a smaller than comparison or an equal-to comparison of a sum of the first and second binary numbers and a sum of the third and fourth binary numbers.

* * * * *